(12) United States Patent
Schmid et al.

(10) Patent No.: US 8,013,085 B2
(45) Date of Patent: Sep. 6, 2011

(54) METHOD FOR THE PRODUCTION OF AN AQUEOUS POLYMER DISPERSION

(75) Inventors: Markus Schmid, Deidesheim (DE); Mubarik Mahmood Chowdhry, Strasbourg (FR); Dieter Distler, Bietigheim-Bissingen (DE); Reinhold J. Leyrer, Dannstadt (DE)

(73) Assignee: BASF Aktiengesellschaft, Ludwigshafen (DE)

(*) Notice: Subject to any disclaimer, the term of this patent is extended or adjusted under 35 U.S.C. 154(b) by 1033 days.

(21) Appl. No.: 10/558,743

(22) PCT Filed: Jun. 4, 2004

(86) PCT No.: PCT/EP2004/006036
§ 371 (c)(1),
(2), (4) Date: Dec. 1, 2005

(87) PCT Pub. No.: WO2004/108782
PCT Pub. Date: Dec. 16, 2004

(65) Prior Publication Data
US 2006/0264558 A1  Nov. 23, 2006

(30) Foreign Application Priority Data
Jun. 6, 2003 (DE) .................. 103 26 127

(51) Int. Cl.
C08F 2/16 (2006.01)
(52) U.S. Cl. ............ 526/93; 526/86; 526/91; 526/92; 524/176; 524/328; 524/457; 524/458
(58) Field of Classification Search .......... 524/458; 525/246; 526/76, 81, 93, 171; 528/392
See application file for complete search history.

(56) References Cited

U.S. PATENT DOCUMENTS

| | | | | |
|---|---|---|---|---|
| 3,947,526 A * | 3/1976 | Bacskai | ........................ | 525/203 |
| 4,683,269 A * | 7/1987 | Aksman | ........................ | 525/258 |
| 5,073,578 A * | 12/1991 | Boodaghains et al. | ........ | 523/201 |
| 5,132,360 A * | 7/1992 | Machado et al. | ................ | 525/64 |
| 5,162,432 A * | 11/1992 | Machado | ........................ | 525/64 |
| 5,401,582 A | 3/1995 | Weyland et al. | | |
| 5,521,266 A * | 5/1996 | Lau | ................................ | 526/200 |
| 5,574,091 A * | 11/1996 | Walther et al. | ................. | 524/570 |
| 6,017,992 A * | 1/2000 | Haddleton et al. | ............ | 524/458 |
| 6,337,131 B1 | 1/2002 | Rupaner et al. | | |
| 6,812,305 B2 | 11/2004 | Kristen et al. | | |
| 6,852,662 B2 | 2/2005 | Queisser et al. | | |
| 7,129,292 B1 * | 10/2006 | Kristen et al. | ................. | 524/804 |
| 2002/0198359 A1 * | 12/2002 | Schmid et al. | ................. | 528/392 |
| 2004/0030040 A1 | 2/2004 | Schmid et al. | | |
| 2004/0167259 A1 | 8/2004 | Schmid et al. | | |

FOREIGN PATENT DOCUMENTS

| | | |
|---|---|---|
| DE | 23 31 921 | 1/1975 |
| DE | 29 23 206 | 12/1980 |
| DE | 33 45 785 | 6/1985 |
| DE | 40 03 422 | 8/1991 |
| DE | 198 29 520 | 1/2000 |
| DE | 199 17 920 | 10/2000 |
| DE | 100 17 660 | 10/2001 |
| DE | 100 61 877 | 6/2002 |
| DE | 101 18 633 | 10/2002 |
| DE | 101 33 042 | 1/2003 |
| DE | 102 29 977 | 1/2004 |
| DE | 103 22 466 | 12/2004 |
| EP | 0 152 175 | 8/1985 |
| EP | 0 955 323 | 11/1999 |
| GB | 1 205 635 | 9/1970 |
| GB | 1 283 213 | 7/1972 |
| WO | 00 20464 | 4/2000 |
| WO | 00 63277 | 10/2000 |
| WO | 01 44325 | 6/2001 |

OTHER PUBLICATIONS

Knovel "Basic Properties of Chemical Compounds". No Author, No Date. www.knovel.com.*
1-Hexene MSDS. Obtained from sciencelab.com. No Author, No Date.*
Versatic Acid Technical Data Sheet. Jul. 2008. Obtained from www.hexion.com. No Author, No Date.*
U.S. Appl. No. 07/651,602, filed Feb. 5, 1991, Weyland, et al.
U.S. Appl. No. 08/011,099, filed Jan. 29, 1993, Weyland, et al.
U.S. Appl. No. 10/168,113, filed Jun. 17, 2002, Kristen, et al.
U.S. Appl. No. 09/959,159.
U.S. Appl. No. 09/719,975, filed Dec. 18, 2000, Queisser, et al.
U.S. Appl. No. 10/556,605, filed Nov. 14, 2005, Schmid, et al.
"Latices", Encyclopedia of Polymer Science and Engineering, vol. 8, pp. 647-677 1987.
D.C. Blackley, "Introduction", High Polymer Latices, vol. 1, pp. 3-65 1966.
H. Warson, "Polyester and Non-Vinyl Emulsions", The Applications of Synthetic Resin Emulsions, Ch. 5, pp. 246-278 1972.
Dieterich. "Polyurethane—nach 50 Jahren immer noch jung" Chemie in unserer Zeit, No. 3, pp. 135-142 1990.
Leclerc et al. "Alternating Ethene/Propene Copolymerization with a Metallocene Catalyst", Angew. Chem. Int. Ed., vol. 37, No. 7, pp. 922-925 1998.
Ziegler et al. "Das Muelheimer Normaldruck-Polyaethylen-Verfahren", Angew. Chem. No. 19/20, pp. 541-547 1955.

(Continued)

*Primary Examiner* — Mark Eashoo
*Assistant Examiner* — Michael A Salvitti
(74) *Attorney, Agent, or Firm* — Oblon, Spivak, McClelland, Maier & Neustadt, L.L.P.

(57) ABSTRACT

Process for preparing an aqueous polymer dispersion by polymerizing at least one ethylenically unsaturated monomer B in an aqueous medium in the presence of polymer particles A and at least one dispersant.

18 Claims, No Drawings

OTHER PUBLICATIONS

Natta et al. "Stereospecific Catalysts for the Head-to-Tail Polymerization of Propylene to a Crystalline Syndiotactic Polymer", J. Am. Chem. Soc., vol. 84, pp. 1488-1490.

Sinn et al. "Ziegler-Natta Catalysis", Advances in Organometallic Chemistry, vol. 18, pp. 99-149 1980.

Mecking. "Olefin Polymerization by Late Transition Metal Complexes- A Root of Ziegler Catalysts Gains New Ground", Angew. Chem. Int. Ed., vol. 40, No. 3, pp. 534-540 2001.

Bauers et al. "High Molecular Mass Polyethylene Aqueous Latexes by Catalytic Polymerization", Angew. Chem. Int. Ed., vol. 40, No. 16, pp. 3020-3022 2001.

Held et al. "Coordination polymerization of ethylene in water by Pd (III) and Ni(III) catalysts", Chem. Commun., pp. 301-302 2000.

Tomov et al. "Emulsion Polymerization of Ethylene in Water Medium Catalysed by Organotransition Metal Complexes", Macromol. Symp., vol. 150, pp. 53-58 2000.

Held et al. "Aqueous Polyketone Latices Prepared with Water-Insoluble Palladium(II) Catalysts", Macromolecules, vol. 35, pp. 3342-3347 2002.

Lindner et al. "Catalytic activity of cationic diphospalladium(II) complexes in the alkene/CO copolymerization in organic solvents and water in dependence on the length of the alkyl chain at the phosphine ligands", Journal of Organometallic Chemistry, vol. 602, pp. 173-187 2000.

Verspui et al. "Ein Stabiler, bemerkenswert aktiver, wasserloeslicher Pd-Katalysator zur alternierenden Copolymerisation von Ethen und CO in Wasser", Angew Chem. vol. 112, No. 4, pp. 825-827 2000.

Ono et al. "Stereoregular Emulsion Polymerization of Butadiene", Journal of Polymer Science: Part A: Polymer Chemistry, vol. 38, pp. 1083-1089 2000.

Rinehart. "Polymerizations Catalyzed by Noble Metal-Olefin Complexes", J. Polymer Sci., part C, No. 27, pp. 7-25 1969.

\* cited by examiner

METHOD FOR THE PRODUCTION OF AN AQUEOUS POLYMER DISPERSION

The present invention relates to a process for preparing an aqueous polymer dispersion by polymerizing at least one ethylenically unsaturated monomer B in an aqueous medium in the presence of particles of at least one polymer A (polymer particles A) and at least one dispersant, wherein the polymerization of the ethylenically unsaturated monomer or monomers B is carried out in the presence of polymer particles A having a weight average particle diameter of $\geq 1$ nm, where the polymer A has been obtained by means of either a) a polymerization initiated by at least one free-radical initiator or b) a polymerization initiated by at least one transition metal complex of at least one ethylenically unsaturated monomer A (monomer A)

and the polymerization of the ethylenically unsaturated monomer or monomers B (monomer B) is initiated i) in case a), by at least one transition metal complex and ii) in case b), by at least one free-radical initiator.

The present invention likewise encompasses the aqueous polymer dispersions obtainable by the process of the present invention, their use as binders in adhesives, sealants, polymer-based plasters and renders, paper coating compositions, paints, for producing nonwovens and for modifying mineral binders or other polymers, and also the polymer powders obtainable from the aqueous polymer dispersions and their corresponding use.

Aqueous polymer dispersions (latices) are generally known. They are fluid systems comprising a plurality of polymer tangles consisting of intertwined polymer chains (referred to as polymer particles) dispersed as disperse phase in an aqueous dispersion medium. The weight average diameter of the polymer particles is frequently in the range from 10 to 5000 nm.

Like polymer solutions on evaporation of the solvent, aqueous polymer dispersions have the potential to form polymer films on evaporation of the aqueous dispersion medium, which is why they are employed, in particular, as binders. Owing to their environmentally friendly properties, they are gaining increasing importance.

Aqueous polymer dispersions are frequently prepared by free-radically initiated aqueous emulsion polymerization [cf., for example, Encyclopedia of Polymer Science and Engineering, Vol. 8, page 659 ff. (1987); D. C. Blackley, in High Polymer Latices, Vol. 1, page 35 ff. (1966); H. Warson, The Applications of Synthetic Resin Emulsions, page 246 ff., chapter 5 (1972); D. Diederich, Chemie in unserer Zeit 24, pages 135 to 142 (1990); Emulsion Polymerization, Interscience Publishers, New York (1965); DE-A 40 03 422 and Dispersionen synthetischer Hochpolymerer, F. Hölscher, Springer-Verlag, Berlin 1969]. A characteristic of this process is that free-radical formers are used as polymerization catalysts and the main monomers used are generally polar monomers.

The preparation of multiphase aqueous polymer dispersions by free-radically initiated aqueous emulsion polymerization of ethylenically unsaturated compounds (monomers) is also adequately known to those skilled in the art. Examples may be found in EP-A 955323, U.S. Pat. No. 4,683,269 and in Billig-Peters, "Kern-Schale Dispersionen mit Hilfe polymerer Azo-Initiatoren", thesis at the University of Bayreuth, 1991.

On the other hand, many polymerization catalysts whose polymerization action is not based on the formation of free radicals but instead on monomer insertion are known. Polymers suitable for these polymerization processes are, in particular, nonpolar monomers. If they are used at all, polar monomers are used in these processes only to a subordinate extent for modifying the polymer properties. The polymerization catalysts used for these polymerization processes are, in particular, catalytically active transition metal complexes or transition metal complexes in combination with compounds which activate the transition metal complexes, known as activators. Owing to the generally high sensitivity of the transition metal complexes or transition metal complex/activator combinations to hydrolysis, these polymerization reactions are usually carried out in the form of a bulk polymerization in which the monomer is at the same time reactant and solvent or in the form of a solution polymerization in which the transition metal complex or the transition metal complex/activator combination, the monomer and the polymer formed are all present in solution in a nonaqueous, frequently aprotic organic solvent. On this subject, mention may be made by way of example of DE-A 10017660, DE-A 10118633, Leclerc et al., Angew. Chem., Int. Ed. Engl. 1998, 37, page 922ff., Ziegler, Angew. Chem., 1955, 67, page 541ff., Natta, J. Am. Chem. Soc. 1962, 84, page 1488ff. and Sinn and Kaminsky, Adv. Organomet. Chem. 1980, 18, page 99ff.

There have recently been increasing reports on the polymerization of monomers by monomer insertion in an aqueous medium using hydrolysis-stable transition metal complexes or transition metal complex/activator combinations. Mention may be made by way of example of the articles by Mecking, Angew. Chem. Int. Ed. 2001, 40, pages 534 to 540, Bauers and Mecking, Angew. Chem. Int. Ed. 2001, 40, pages 3020 to 3022, Mecking et al. Chem. Commun. 2000, pages 301 and 302, Tomov et al., Macromol. Symp. 2000, 150, pages 53 to 58, and the patent publications WO 01/44325, WO 00/20464, DE-A 2923206 and DE-A 3345785.

The polymerization of monomers with carbon monoxide in an aqueous medium via monomer insertion using hydrolysis-stable transition metal complexes or transition metal complex/activator combinations is also known. Examples may be found in Held et al., Macromolecules 2002, 35, pages 3342 to 3347, Lindner et al., J. Organomet. Chem. 2000, 602, pages 173ff., Sheldon et al., Angew. Chem. 2000, 112, pages 825ff. and in the patent publications WO 00/63277, DE-A 19829520, DE-A 19829520, DE-A 19917920 and DE-A 10061877.

In addition, conjugated dienes such as butadiene can also be polymerized by means of insertion in an aqueous medium using hydrolysis-stable transition metal complexes or transition metal complex/activator combinations [cf., for example, Ono and Kato, J. Polym. Sci. A. 2000, 38, pages 1083 to 1089, Rinehart, J. Polym. Sci. C. 1969, 27, pages 7 to 25, and also U.S. Pat. No. 3,892,722 and EP-A 152175].

Furthermore, the German application number DE-A 10322466.1, which is not a prior publication, discloses the polymerization of ethylenically unsaturated monomers in an aqueous medium which is carried out by means of a solid polymerization catalyst, the German patent application number DE-A 10229977.3, which is likewise not a prior publication, discloses the corresponding polymerization by means of polymerization catalysts present in wax particles and the German patent application number DE-A 10133042.1, which is also not a prior publication, discloses the preparation of aqueous polymer dispersions by polymerization of ethylenically unsaturated compounds in the presence of transition metal complexes as catalysts and in the presence of carbon monoxide by means of a miniemulsion polymerization process.

The preparation of multiphase aqueous polymer dispersions by polymerizing ethylenically unsaturated monomers by means of hydrolysis-stable transition metal complexes or transition metal complex/activator combinations is also adequately known to those skilled in the art. Examples may be found in, for example, Ono and Kato, J. Polym. Sci. A. 2000, 38, pages 1083 to 1089.

The preparation of aqueous polymer dispersions by means of free-radical emulsion polymerization has the advantage that the polymer properties, for example the glass transition temperature, can be varied in a simple fashion within a wide range by appropriate choice of the monomers used for the polymerization and the auxiliaries, for example free-radical initiators, regulators, etc., are readily available compounds. A disadvantage is, however, that the ethylenically unsaturated compounds usually employed as main monomers for the polymerization, for example esters of acrylic or methacrylic acid, styrene, vinyl chloride, vinylidene chloride and the vinyl esters of organic mono-carboxylic acids, are relatively expensive because of the reaction steps required for their preparation and monomers which are available at low cost, for example ethene, frequently polymerize only slowly by a free-radical mechanism. On the other hand, the preparation of aqueous polymer dispersions by means of a polymerization catalyzed by transition metal complexes can be carried out using fast-reacting nonpolar monomers which are available at low cost, for example ethene, propene, butene, butadiene, etc., while polar monomers such as esters of acrylic or methacrylic acid, styrene, vinyl chloride, vinylidene chloride and the vinyl esters of organic monocarboxylic acids can likewise be used but frequently react significantly more slowly. A further disadvantage is that the metal complexes suitable for the polymerization catalyzed by transition metal complexes are generally more expensive than the free-radical initiators used for the free-radically initiated aqueous emulsion polymerization.

It is an object of the present invention to provide a process for preparing aqueous polymer dispersions which combines the advantages of the free-radically initiated polymerization and those of the polymerization catalyzed by transition metal complexes.

We have found that this object is achieved by the process defined at the outset.

An important aspect of the process is that when the polymer A has been obtained by means of a polymerization of at least one ethylenically unsaturated monomer A initiated by at least one free-radical initiator, the polymerization of the ethylenically unsaturated monomer or monomers B is initiated by at least one transition metal complex (process 1), and when the polymer A has been obtained by means of a polymerization of at least one ethylenically unsaturated monomer A initiated by at least one transition metal complex, the polymerization of the ethylenically unsaturated monomer or monomers B is initiated by at least one free-radical initiator (process 2).

Possible ethylenically unsaturated monomers for the free-radically initiated polymerization (monomers A in process 1 and monomers B in process 2) are, in particular, ethylenically unsaturated monomers which can readily be polymerized by a free-radical mechanism, for example ethylene, vinylaromatic monomers such as styrene, α-methylstyrene, o-chlorostyrene or vinyltoluenes, vinyl halides such as vinyl chloride or vinylidene chloride, esters of vinyl alcohol and monocarboxylic acids having from 1 to 18 carbon atoms, e.g. vinyl acetate, vinyl propionate, vinyl n-butyrate, vinyl laurate and vinyl stearate, esters of α,β-monoethylenically unsaturated monocarboxylic and dicarboxylic acids which preferably have from 3 to 6 carbon atoms, in particular acrylic acid, methacrylic acid, maleic acid, fumaric acid and itaconic acid, with alkanols generally having from 1 to 12, preferably from 1 to 8 and in particular from 1 to 4, carbon atoms, especially methyl, ethyl, n-butyl, isobutyl, pentyl, hexyl, heptyl, octyl, nonyl, decyl and 2-ethylhexyl acrylates and methacrylates, dimethyl or di-n-butyl fumarate and maleate, nitriles of α,β-monoethylenically unsaturated carboxylic acids, e.g. acrylonitrile, methacrylonitrile, fumaronitrile, maleonitrile, and $C_{4-8}$-conjugated dienes such as 1,3-butadiene and isoprene. The monomers mentioned generally form the main monomers which, based on the total amount of monomers, make up a proportion of more than 50% by weight, preferably more than 80% by weight. In general, these monomers have only a moderate to low solubility in water under normal conditions [20° C., 1 bar (absolute)].

Monomers which have an increased solubility in water under the abovementioned conditions are ones which contain either at least one acid group and/or a corresponding anion thereof or at least one amino, amido, ureido or N-heterocyclic group and/or a corresponding ammonium derivative protonated or alkylated on the nitrogen. Examples which may be mentioned are α,β-monoethylenically unsaturated monocarboxylic and dicarboxylic acids and their amides, e.g. acrylic acid, methacrylic acid, maleic acid, fumaric acid, itaconic acid, acrylamide and methacrylamide, also vinylsulfonic acid, 2-acrylamido-2-methylpropanesulfonic acid, styrenesulfonic acid and their water-soluble salts and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. The abovementioned monomers are normally used only as modifying monomers in amounts, based on the total amount of monomers, of less than 10% by weight, preferably less than 5% by weight.

Monomers which usually increase the internal strength of the films of the polymer matrix normally have at least one epoxy, hydroxy, N-methylol or carbonyl group or at least two nonconjugated ethylenically unsaturated double bonds. Examples are monomers having two vinyl radicals, monomers having two vinylidene radicals and also monomers having two alkenyl radicals. Here, the diesters of dihydric alcohols with α,β-monoethylenically unsaturated monocarboxylic acids are particularly advantageous, with acrylic and methacrylic acids being preferred. Examples of such monomers having two nonconjugated ethylenically unsaturated double bonds are alkylene glycol diacrylates and dimethacrylates, e.g. ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Further monomers of particular importance in this context are $C_1$-$C_8$-hydroxyalkyl esters of methacrylic acid and acrylic acid, e.g. n-hydroxyethyl, n-hydroxypropyl or n-hydroxybutyl acrylate and methacrylate and also compounds such as diacetoneacrylamide and acetylacetoxyethyl acrylate or methacrylate. The abovementioned monomers are frequently used in amounts of up to 10% by weight, but preferably less than 5% by weight, in each case based on the total amount of monomers.

Monomer mixtures which can be used particularly advantageously according to the present invention for the free-radical polymerization step are mixtures comprising

| | |
|---|---|
| from 50 to 99.9% by weight | of esters of acrylic and/or methacrylic acid with alkanols having from 1 to 12 carbon atoms and/or styrene, or |
| from 50 to 99.9% by weight | of styrene and/or butadiene, or |
| from 50 to 99.9% by weight | of vinyl chloride and/or vinylidene chloride, or |
| from 40 to 99.9% by weight | of vinyl acetate, vinyl propionate, vinyl esters of Versatic acid and/or vinyl esters of long-chain fatty acids. |

In particular, the free-radical polymerization step according to the present invention can be carried out using monomer mixtures comprising

| | |
|---|---|
| from 0.1 to 5% by weight | of at least one α,β-monoethylenically unsaturated monocarboxylic or dicarboxylic acid having from 3 to 6 carbon atoms and/or its amide and |
| from 50 to 99.9% by weight | of at least one ester of acrylic and/or methacrylic acid with alkanols having from 1 to 12 carbon atoms and/or styrene, or |
| from 0.1 to 5% by weight | of at least one α,β-monoethylenically unsaturated monocarboxylic or dicarboxylic acid having from 3 to 6 carbon atoms and/or its amide and |
| from 50 to 99.9% by weight | of styrene and/or butadiene, or |
| from 0.1 to 5% by weight | of at least one α,β-monoethylenically unsaturated monocarboxylic or dicarboxylic acid having from 3 to 6 carbon atoms and/or its amide and |
| from 50 to 99.9% by weight | of vinyl chloride and/or vinylidene chloride, or |
| from 0.1 to 5% by weight | of at least one α,β-monoethylenically unsaturated monocarboxylic or dicarboxylic acid having from 3 to 6 carbon atoms and/or its amide and |
| from 40 to 99.9% by weight | of vinyl acetate, vinyl propionate, vinyl esters of Versatic acid and/or vinyl esters of long-chain fatty acids. |

Accordingly, the free-radical polymerization gives polymers which are made up of the abovementioned monomers in polymerized form.

It is important that the monomers or monomer mixtures can also be polymerized in the step or gradated mode known to those skilled in the art. It may also be stated at this point that, for the purposes of the present text, the term monomer also encompasses monomer mixtures and the term polymer also encompasses copolymers.

It is of importance that the polymer particles A are frequently used as stable aqueous dispersions in both processes. They can either be in the form of a primary dispersion or in the form of a secondary dispersion.

The preparation of an aqueous secondary polymer dispersion in process 1, for example by means of a free-radical solution polymerization, introduction of this solution polymer into the aqueous medium and removal of the solvent to form an aqueous dispersion of the polymer particles A, is known to those skilled in the art (cf., for example, EP-A 467906, EP-A 691384 or Schlarb et al., Prog. Org. Coat. 1995 (29), pages 201 to 208). However, the polymer particles A in process 1 are preferably used in the form of an aqueous primary dispersion.

Like the free-radical polymerization of monomer B in process 2, the formation of a primary dispersion of polymer particles A in process 1 is also carried out by the method of free-radically initiated aqueous emulsion polymerization, with which those skilled in the art are familiar. It is usually carried out by dispersing the monomer or monomers A or B in an aqueous medium with addition of at least one dispersant and polymerizing the monomer(s) by means of at least one free-radical polymerization initiator.

Suitable free-radical polymerization initiators include all those which are able to trigger a free-radical aqueous emulsion polymerization. They can in principle be either peroxides or azo compounds. Of course, redox initiator systems are also possible. As peroxides, it is in principle possible to use inorganic peroxides such as hydrogen peroxide or peroxodisulfates such as the mono- or di-alkali metal or ammonium salts of peroxodisulfuric acid, for example their mono- and di-sodium, -potassium or -ammonium salts, or organic peroxides such as alkyl hydroperoxides, for example tert-butyl, p-menthyl or cumyl hydroperoxide, and also dialkyl or diaryl peroxides such as di-tert-butyl or dicumyl peroxide. Azo compounds which can be used are, in particular, 2,2'-azobis (isobutyronitrile), 2,2'-azobis(2,4-dimethylvaleronitrile) and 2,2'-azobis(amidinopropyl)dihydrochloride (corresponds to V-50 from Wako Chemicals). Suitable oxidants for redox initiator systems are essentially the peroxides mentioned above. As corresponding reducing agents, it is possible to use sulfur compounds having a low oxidation state, e.g. alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, especially potassium and/or sodium salts, of aliphatic sulfinic acids and alkali metal hydrogensulfides such as potassium and/or sodium hydrogensulfide, salts of polyvalent metals, e.g. iron(II) sulfate, iron(II) ammonium sulfate, iron(II) phosphate, enediols such as dihydroxymaleic acid, benzoin and/or ascorbic acid and also reducing saccharides such as sorbose, glucose, fructose and/or dihydroxyacetone. In general, the amount of free-radical polymerization initiator is from 0.05 to 5.0 parts by weight, often from 0.1 to 3.0 parts by weight and frequently from 0.2 to 2.0 parts by weight, in each case based on 100 parts by weight of the monomers used in the free-radical polymerization step.

The way in which the polymerization initiator is added to the polymerization mixture is of rather subordinate importance in terms of the success of the process of the present invention. The polymerization initiator can either all be placed in the polymerization vessel at the beginning or it can be added continuously or stepwise during the course of the free-radical aqueous emulsion polymerization at a rate corresponding to that at which it is consumed. In detail, this depends in a manner known to those skilled in the art both on the chemical nature of the initiator system and on the polymerization temperature and the monomers to be polymerized.

To adjust the molecular weight, it is additionally possible to add, if desired, molecular weight regulators known to those skilled in the art, for example alcohols such as butenediol or isopropanol, mercapto compounds such as 2-mercaptoethanol or tert-dodecyl mercaptan or haloform compounds such as bromoform or chloroform, usually in amounts of from 0.1 to 5% by weight, based on the total amount of the monomers used in the free-radical polymerization step.

Possible reaction temperatures for the free-radical aqueous emulsion polymerization are in the range from 0 to 170° C. In general, temperatures of from 50 to 120° C., frequently from 60 to 110° C. and often from ≧70 to 100° C., are employed. The free-radical aqueous emulsion polymerization can be carried out at a pressure of less than, equal to or greater than 1 bar (absolute). Volatile monomers such as ethylene, butadiene or vinyl chloride are preferably polymerized under superatmospheric pressure. Here, the pressure can be 1.2, 1.5, 2, 5, 10, 15 bar or even higher. If emulsion polymerizations are carried out under subatmospheric pressure, pressures of ≦950 mbar, frequently ≦900 mbar and often ≦850 mbar (absolute), are set. The free-radical aqueous emulsion polymerization is advantageously carried out under an inert gas atmosphere, for example under nitrogen or argon.

The monomers are usually polymerized to a conversion of at least 80%, and preference is generally given to a monomer conversion of ≧90%, ≧95% or ≧98%.

Ethylenically unsaturated monomers which are suitable according to the invention for the polymerization initiated by means of at least one transition metal complex (monomers B in process 1 and monomers A in process 2) include both pure ethylenically unsaturated nonpolar hydrocarbon compounds and polar heteroatom-containing α-olefins such as (meth) acrylic esters and homoallyl or allyl alcohols, ethers or halides. Among the pure ethylenically unsaturated nonpolar hydrocarbons, $C_2$-$C_{20}$-1-alkenes are suitable. Among these, particular mention may be made of the low molecular weight alkenes, for example ethene, or α-alkenes having from 3 to 20 carbon atoms, e.g. propene, 1-butene, 1-pentene, 1-hexene, 1-heptene, 1-octene or 1-decene. Of course, it is also possible to use cyclic olefins such as cyclopentene, cyclohexene, dicyclopentadiene or norbornene, conjugated dienes such as 1,3-butadiene(butadiene), 2-chlorobutadiene, 2-methylbutadiene or 2,3-dimethylbutadiene, aromatic olefin compounds such as styrene, α-methylstyrene or ortho-, meta- or para-vinyltoluene and also vinyl esters, such as vinyl acetate or vinyl propionate. However, the $C_2$-$C_{20}$-1-alkenes are particularly useful. Among these, special mention may be made of ethene, propene, 1-butene, 1-pentene, 1-hexene or 1-octene and also 1-decene, 1-dodecene, 1-tetradecene, 1-hexadecene and 1-octadecene and also olefin fractions from a cracker in which these are present. It is of course possible, according to the present invention, to use the abovementioned monomers individually or as mixtures. The monomers mentioned generally form the main monomers which, based on the total amount of monomers, make up a proportion of ≧50% by weight, in particular ≧80% by weight or ≧90% by weight. The monomer mixture to be polymerized by means of at least one transition metal complex frequently consists of 100% by weight of at least one of the abovementioned monomers.

However, it is also possible to use the abovementioned monomers in admixture with polar ethylenically unsaturated monomers containing, as structural element, at least one amide group, acid group and/or corresponding anion. Mention may be made by way of example of α,β-monoethylenically unsaturated monocarboxylic and dicarboxylic acids and their amides, e.g. acrylic acid, methacrylic acid, maleic acid, fumaric acid, itaconic acid, acrylamide, methacrylamide, also vinylsulfonic acid, 2-acrylamido-2-methylpropanesulfonic acid, styrenesulfonic acid, 10-undecenoic acid, 3-butenoic acid, 4-pentenoic acid, 5-hexenoic acid and their corresponding alkali metal and ammonium salts. Normally, the monomers containing amide or acid groups are present only as modifying monomers in amounts of ≦50% by weight, ≦10% by weight, preferably ≦5% by weight, in each case based on the total amount of monomers.

It is important that the polymer particles A obtainable by polymerizing at least one monomer A using at least one transition metal complex can be present either in the form of a primary dispersion or in the form of a secondary dispersion.

The preparation of an aqueous, secondary polymer dispersion in process 2, for example by means of a solution polymerization catalyzed by a transition metal complex, introduction of this solution polymer into the aqueous medium and removal of the solvent to form an aqueous dispersion of the polymer particles A, is in principle known to those skilled in the art (cf., for example, DE-A 19821746 or Echersley et al., Am. Chem. Soc., Div. Polym. Chemistry, 1977 (38), pages 630ff.). However, the polymer particles A in process 2 are preferably used in the form of an aqueous primary dispersion.

Like the polymerization of monomer B in the presence of transition metal complexes as catalysts in process 1, the formation of a primary dispersion of polymer particles A in process 2 is also carried out by the method of polymerization in the presence of transition metal complexes as catalysts in an aqueous medium, as is well-known to those skilled in the art. This is usually carried out by polymerizing at least one monomer A or B by means of at least one suitable transition metal complex in an aqueous medium with addition of at least one dispersant. It is of importance that this polymerization can also be carried out in the presence of carbon monoxide.

The polymerization catalyzed by transition metal complexes can be carried out using any transition metal complexes which are able to initiate a polymerization of ethylenically unsaturated monomers in an aqueous medium. For example, the complexes mentioned in the prior art are suitable for the polymerization according to the present invention.

As transition metal complexes which are particularly useful for the polymerization of monomer A or monomer B in an aqueous medium, mention may be made by way of example of the complexes disclosed in DE-A 10133042:
[1,3-bis(diphenylphosphino)propane]palladium(II) acetate,
[1,3-bis(di(2-methoxyphenyl)phosphino)propane]palladium(II) acetate,
[1,3-bis(dimethylphosphino)propane]palladium(II) acetate,
[1,3-bis(diethylphosphino)propane]palladium(II) acetate,
[1,3-bis(di(n-propyl)phosphino)propane]palladium(II) acetate,
[1,3-bis(di(isopropyl)phosphino)propane]palladium(II) acetate,
[1,3-bis(di(n-butyl)phosphino)propane]palladium(II) acetate,
[1,3-bis(di(n-pentyl)phosphino)propane]palladium(II) acetate,
[1,3-bis(di(n-hexyl)phosphino)propane]palladium(II) acetate,
[1,3-bis(di(isohexyl)phosphino)propane]palladium(II) acetate,
[1,3-bis(di(neohexyl)phosphino)propane]palladium(II) acetate,
[1,3-bis(di(n-heptyl)phosphino)propane]palladium(II) acetate,
[1,3-bis(di(3-(cyclopentyl)propyl)phosphino)propane]palladium(II) acetate,
[1,3-bis(di(n-octyl)phosphino)propane]palladium(II) acetate,
[1,3-bis(di(n-nonyl)phosphino)propane]palladium(II) acetate,
[1,3-bis(di(n-decyl)phosphino)propane]palladium(II) acetate,

[1,3-bis(di(n-dodecyl)phosphino)propane]palladium(II) acetate,
[1,3-bis(di(n-tetradecyl)phosphino)propane]palladium(II) acetate,
[1,3-bis(di(3-(cyclohexyl)propyl)phosphino)propane]palladium(II) acetate, or
[1,3-bis(di(n-hexadecyl)phosphino)propane]palladium(II) acetate,
the complexes disclosed in DE-A 10061877:
[1,3-bis(di-hydroxyphenyl)phosphinopropane]palladium(II) acetate,
[1,3-bis(di-4-hydroxybutyl)phosphinopropane]palladium(II) acetate,
[1,3-bis(di-4-methylol-5-hydroxypentyl)phosphinopropane]palladium(II) acetate,
[1,3-bis(di-5-hydroxypentyl)phosphinopropane]palladium(II) acetate,
[1,3-bis(di-6-hydroxyhexyl)phosphinopropane]palladium(II) acetate,
[1,3-bis(di(3-hydroxycyclopentyl)propyl)phosphinopropane]palladium(II) acetate,
[1,3-bis(di-8-hydroxyoctyl)phosphinopropane]palladium(II) acetate,
[1,3-bis(di-3-hydroxycyclohexyl)propyl)phosphinopropane]palladium(II) acetate,
[1,3-bis(di-sulfonatophenyl)phosphinopropane]palladium(II) acetate,
[1,3-bis(di-4-sulfonatobutyl)phosphinopropane]palladium(II) acetate,
[1,3-bis(di-4-methylol-5-sulfonatopentyl)phosphinopropane]palladium(II) acetate,
[1,3-bis(di-5-sulfonatopentyl)phosphinopropane]palladium(II) acetate,
[1,3-bis(di-6-sulfonatohexyl)phosphinopropane]palladium(II) acetate,
[1,3-bis(di(3-sulfonatocyclopentyl)propyl)phosphinopropane]palladium(II) acetate,
[1,3-bis(di-8-sulfonatooctyl)phosphinopropane]palladium(II) acetate,
[1,3-bis(di-3-sulfonatocyclohexyl)propyl)phosphinopropane]palladium(II) acetate,
[1,3-bis(di-carboxyphenyl)phosphinopropane]palladium(II) acetate,
[1,3-bis(di-4-carboxybutyl)phosphinopropane]palladium(II) acetate,
[1,3-bis(di-4-methylol-5-carboxypentyl)phosphinopropane]palladium(II) acetate,
[1,3-bis(di-5-carboxypentyl)phosphinopropane]palladium(II) acetate,
[1,3-bis(di-6-carboxyhexyl)phosphinopropane]palladium(II) acetate,
[1,3-bis(di(3-carboxycyclopentyl)propyl)phosphinopropane]palladium(II) acetate,
[1,3-bis(di-8-carboxyoctyl)phosphinopropane]palladium(II) acetate, or
[1,3-bis(di-3-carboxycyclohexyl)propyl)phosphinopropane]palladium(II) acetate, the complexes disclosed in DE-A 10107452:
N,N,N-trimethyl-1-hexadecanaminium (T-4)-[1-(diphenylphosphino-κP)-2-(hydroxy-κO)-2-(4-methylphenyl)ethylenesulfonato]phenylnickel(II)(triphenylphosphine) or sodium (T-4)-[1-(diphenylphosphino-κP)-2-(hydroxy-κO)-2-(4-methylphenyl)ethylenesulfonato]phenylnickel(II)(triphenylphosphine),
the complexes disclosed in the German patent application number DE-A 10240577.8, which is not a prior publication:
[2-[[[2,6-bis(1-methylethyl)phenyl]imino-κN]methyl]-4,6-diiodophenolato-κO]methyl-nickel(II)(pyridine),
[2-[[[2,6-bis(1-methylethyl)phenyl]imino-κN]methyl]-4,6-diiodophenolato-κO]phenyl-nickel(II)(triphenylphosphine),
[2-[[[2,6-bis(1-methylethyl)phenyl]imino-κN]methyl]-4,6-diphenylphenolato-κO]phenyl-nickel(II)(triphenylphosphine),
[2-[[[2,6-bis(phenyl)phenyl]imino-κN]methyl]-4,6-diphenylphenolato-κO]phenyl-nickel(II)(triphenylphosphine) or
[2-[[[2,6-bis(phenyl)phenyl]imino-κN]methyl]-4,6-diiodophenolato-κO]phenyl-nickel(II)(triphenylphosphine),
and also the complex systems disclosed in the German patent application number DE-A 10234005.6, which is likewise not a prior publication.

The specific reaction conditions such as temperatures, pressures, amounts of catalyst, etc., are also disclosed in the appropriate prior art. The polymerization catalyzed by transition metal complexes is frequently carried out in the absence of oxygen, for example under an inert gas atmosphere such as nitrogen or argon or under a carbon monoxide or monomer atmosphere. The polymerization temperature and the polymerization pressure are strongly dependent on the activity of the transition metal complex used and the reactivity of the monomers to be reacted. The polymerization temperature can be from 0 to 200° C., or from 20 to 150° C. or from 40 to 120° C., and the polymerization pressure measured in the gas phase can be from 1 to 300 bar, or from 5 to 200 bar or from 10 to 100 bar (in each case absolute values).

Another important aspect is that the polymerization of ethylenically unsaturated monomers A (process 2) or B (process 1) in the presence of transition metal complexes as catalysts in an aqueous medium can also be carried out in the presence of and with incorporation of carbon monoxide. Transition metal complexes suitable for this purpose and the conditions under which polymerization in an aqueous medium is carried out are disclosed, for example, in DE-A 10061877 or DE-A 10125238.

Furthermore, the polymerization of ethylenically unsaturated monomers A (process 2) or B (process 1) in the presence of transition metal complexes as catalysts in an aqueous medium can also be carried out in the form of the ring-opening metathesis polymerizations disclosed, for example, in DE-A 19859191.

The process of the present invention is carried out using at least one dispersant which keeps the polymer particles A used for the polymerization and the polymer particles formed during the polymerization of monomer B dispersed in the aqueous phase and thus ensures the stability of the aqueous polymer dispersion produced. Possible dispersants include both protective colloids and emulsifiers.

Suitable protective colloids are, for example, polyvinyl alcohols, polyalkylene glycols, alkali metal salts of polyacrylic acids and polymethacrylic acids, cellulose derivatives, starch derivatives and gelatin derivatives or copolymers comprising acrylic acid, methacrylic acid, maleic anhydride, 2-acrylamido-2-methylpropanesulfonic acid and/or 4-styrenesulfonic acid and alkali metal salts thereof and also homopolymers and co-polymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide and methacrylamide and acrylates, methacrylates, acrylamides and/or methacrylamides bearing amine groups. A comprehensive description of further suitable protective coloids may be found in Houben-Weyl, Methoden der organischen Chemie, volume XIV/1, Makromolekulare Stoffe, Georg-Thieme-Verlag, Stuttgart, 1961, pages 411 to 420.

It is of course also possible to use mixtures of emulsifiers and/or protective colloids. The dispersants used are frequently exclusively emulsifiers whose relative molecular weights are, unlike the protective colloids, usually below 1500. They can be either anionic, cationic or nonionic in nature. If mixtures of surface-active substances are used, it is self-evident that the individual components have to be compatible with one another, which in the case of doubt can be checked by means of a few preliminary tests. In general, anionic emulsifiers are compatible with one another and with nonionic emulsifiers. The same applies to cationic emulsifiers, while anionic and cationic emulsifiers are usually not compatible with one another. An overview of suitable emulsifiers may be found in Houben-Weyl, Methoden der organischen Chemie, volume XIV/1, Makromolekulare Stoffe, Georg-Thieme-Verlag, Stuttgart, 1961, pages 192 to 208.

Nonionic emulsifiers which can be used are, for example, ethoxylated monoalkylphenols, dialkylphenols and trialkylphenols (EO units: 3 to 50, alkyl radical: $C_4$ to $C_{12}$) and ethoxylated fatty alcohols (EO units: 3 to 80; alkyl radical: $C_8$ to $C_{36}$). Examples of such emulsifiers are the Lutensol® A grades ($C_{12}$-$C_{14}$ fatty alcohol ethoxylates, EO units: 3 to 8), Lutensol® AO grades ($C_{13}$-$C_{15}$ oxo alcohol ethoxylates, EO units: 3 to 30), Lutensol® AT grades ($C_{16}$-$C_{18}$ fatty alcohol ethoxylates, EO units: 11 to 80), Lutensol® ON grades ($C_{10}$ oxo alcohol ethoxylates, EO units: 3 to 11) and the Lutensol® TO grades ($C_{13}$ OXO alcohol ethoxylates, EO units: 3 to 20) from BASF AG.

Customary anionic emulsifiers are, for example, alkali metal and ammonium salts of alkyl sulfates (alkyl radical: $C_8$ to $C_{12}$), of sulfuric monoesters of ethoxylated alkanols (EO units: 4 to 50, alkyl radical: $C_{12}$ to $C_{18}$) and ethoxylated alkylphenols (EO units: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Further anionic emulsifiers which have been found to be useful are compounds of the formula I

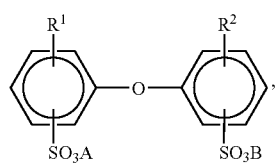

(I)

where $R^1$ and $R^2$ are each hydrogen atoms or $C_4$-$C_{24}$-alkyl and are not both hydrogen atoms, and A and B can be alkali metal ions and/or ammonium ions. In the formula I, $R^1$ and $R^2$ are preferably linear or branched alkyl radicals having from 6 to 18 carbon atoms, in particular 6, 12 or 16 carbon atoms, or hydrogen, with $R^1$ and $R^2$ not both being hydrogen atoms. A and B are preferably sodium, potassium or ammonium, particularly preferably sodium. Compounds I in which A and B are each sodium, $R^1$ is a branched alkyl radical having 12 carbon atoms and $R^2$ is a hydrogen atom or $R^1$ are particularly advantageous. Use is frequently made of industrial mixtures having a proportion of from 50 to 90% by weight of the monoalkylated product, for example Dowfax® 2A1 (trade name of Dow Chemical Company). The compounds I are generally known, e.g. from U.S. Pat. No. 4,269,749, and are commercially available.

Suitable cation-active emulsifiers are, as a rule, primary, secondary, tertiary or quaternary ammonium salts bearing a $C_6$-$C_{18}$-alkyl, $C_6$-$C_{18}$-alkylaryl or heterocyclic radical, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts. Examples which may be mentioned are dodecylammonium acetate or the corresponding hydrochloride, the chlorides or acetates of the various 2-(N,N,N-trimethylammonium)ethylparaffinic esters, N-cetylpyridinium chloride, N-laurylpyridinium sulfate and N-cetyl-N,N,N-trimethylammonium bromide, N-dodecyl-N,N,N-trimethylammonium bromide, N-octyl-N,N,N-trimethlyammonium bromide, N,N-distearyl-N,N-dimethylammonium chloride and also the gemini surfactant N,N'-(lauryldimethyl)ethylenediamine dibromide. Numerous further examples may be found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989.

However, nonionic and/or anionic emulsifiers are especially useful.

In general, a total of from 0.05 to 20 parts by weight, frequently from 0.1 to 10 parts by weight and often from 1 to 7 parts by weight, of dispersant are used per 100 parts by weight of the aqueous medium formed by the amounts of deionized water and the dispersant or dispersants.

The deionized water is used in such an amount that the polymer solids content of the aqueous polymer dispersion obtained according to the present invention is from 5 to 75% by weight, frequently from 10 to 65% by weight and often from 20 to 55% by weight, in each case based on the aqueous polymer dispersion.

In the process of the present invention, at least a partial amount of the deionized water and of the dispersant or dispersants and at least a partial amount of the polymer particles A are initially placed in the polymerization vessel and any remaining amounts of polymer particles A, deionized water and the dispersant or dispersants are added continously or discontinuously during the course of the polymerization of the monomer B. In general, the monomer B is also fed continuously or discontinuously into the polymerization vessel at a rate corresponding to that at which it reacts during the polymerization. Often, the total amount of the polymer particles A is placed in the polymerization vessel before commencement of the polymerization of the monomer B. In process 1, the total amount of the dispersant or dispersants and/or the deionized water is frequently placed in the polymerization vessel before commencement of the polymerization of the monomer B, while in process 2, a partial amount of the dispersant or dispersants and/or the deionized water is frequently fed together with the monomers B in the form of an aqueous monomer emulsion into the aqueous dispersion of the polymer particles A under polymerization conditions.

The weight average particle size of the polymer particles A is ≧1 nm and often ≦1000 nm. The weight average particle diameter is frequently ≧5 nm, ≧10 nm, ≧20 nm, ≧30 nm, ≧40 nm, ≧50 nm, ≧60 nm, ≧70 nm, ≧80 nm, ≧90 nm or ≧100 nm and all values in between and ≦700 nm, ≦500 nm, ≦400 nm, ≦350 nm, ≦300 nm, ≦250 nm, ≦200 nm, ≦150 nm, ≦100 nm, ≦90 nm, ≦80 nm, ≦70 nm, ≦60 nm, ≦50 nm or ≦40 nm and all values in between. The determination of the weight average particle diameter is known to those skilled in the art and is carried out, for example, by the method of the analytical ultracentrifuge. For the purposes of the present text, the weight average particle diameter is the weight average $D_{w50}$ value determined by the method of the analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Macchtle, pages 147 to 175).

It can be advantageous for the polymer particles A to be monomodal and have a narrow particle size distribution. For the purposes of the present text, the particle size distribution is considered to be narrow when the ratio of the weight average particle diameter $D_{w50}$ to the number average particle diameter $D_{N50}$ [$D_{W50}/D_{N50}$] determined by the method of the analytical ultracentrifuge is $\leq 2.0$, preferably $\leq 1.5$ and particularly preferably $\leq 1.2$ or $\leq 1.1$.

Depending essentially on the emulsifier concentration during the polymerization, the process of the present invention can be controlled so that during the polymerization of the monomer or monomers B virtually no new polymer particles in addition to the polymer particles A already present are formed and two-phase polymer particles made up of polymer A and polymer B obtained by polymerization of the monomers B are thus produced. This is the case particularly when the emulsifier concentration during the polymerization is controlled so that no new emulsifier micelles are formed. The corresponding measures are known to those skilled in the art. The resulting polymer particles made up of polymer A and polymer B can have various particle morphologies, for example core/shell structures, raspberry structures or half-moon structures, etc. The weight average particle diameters of the two-phase polymer particles formed are frequently from 50 to 1000 nm, often from 70 to 700 nm or from 80 to 500 nm or from 90 to 400 nm or from 100 to 300 nm.

If, on the other hand, the emulsifier concentration is controlled so that new emulsifier micelles are formed, particles of the polymer B (polymer particles B) can be formed in addition to the polymer particles A. The formation of aqueous polymer dispersions comprising polymer particles A, polymer particles B and two-phase polymer particles (made up of polymers A and B) is also possible. The measures to be implemented for this purpose are known to those skilled in the art or can be determined by means of a few preliminary tests by a person skilled in the art.

In general, the ratio of polymer A to the ethylenically unsaturated monomer or monomers B is from 1:1000 to 1000:1, but can also be from 1:500 to 500:1, from 1:200 to 200:1, from 1:100 to 100:1, from 1:50 to 50:1, from 1:20 to 20:1 or from 1:10 to 10:1. Preference is given to a ratio of from 1:100 to 100:1, from 1:50 to 50:1, from 1:20 to 20:1 or from 1:10 to 10:1.

An important aspect is that the process of the present invention can also be carried out in the presence of an organic solvent. A solvent is used particularly when transition metal complexes which have a low solubility in the aqueous medium are used for the polymerization. In such a case, the complex is frequently taken up in an organic solvent and introduced in the form of an organic solution into the aqueous medium. If polymer particles A produced by a free-radical mechanism are already present (process 1), the solvent and the transition metal complex frequently diffuse into the existing polymer particles A, which can cause them to swell. As organic solvents, it is possible to use polar protic or polar aprotic organic compounds having a molecular weight of $\leq 200$ g/mol. Examples are polar aprotic organic solvents such as halogenated hydrocarbons, for example dichloromethane, dichloroethane or chloroform, aromatic hydrocarbons, for example benzene, toluene, ethylbenzene, xylene or chlorobenzene, or aliphatic ethers such as tetrahydrofuran or any mixtures of these compounds. It is also possible to use acetonitrile or acetone as liquid polar aprotic solvent or as a component of a plurality thereof. Examples of polar protic organic solvents are $C_1$-$C_{10}$-alkanols, in particular $C_1$-$C_6$-alkanols, for example methanol, ethanol, n-propanol, isopropanol, 1-butanol, 2-butanol, 2-methyl-2-propanol and also the corresponding isomeric pentanols, hexanols or heptanols.

It is also possible to take up a transition metal complex having a low solubility in the aqueous medium in an organic solvent which likewise has a low solubility in the aqueous medium. This is done particularly when no polymer particles A produced by a free-radical mechanism are present (process 2). In this case, the transition metal complex is taken up in an organic solvent which has a low solubility in the aqueous medium and stirred into the aqueous medium in the presence of at least one dispersant to form solvent droplets having a size of $\leq 1000$ nm, $\leq 500$ nm or $\leq 300$ nm. The measures and apparatuses necessary for this, for example ultrasonic or high-pressure homogenizers, e.g. pressure slits or other homogenizers such as tooth ring dispersers, etc., are known to those skilled in the art (cf., for example, GB-A 2250930, U.S. Pat. No. 5,108,654 and P. L. Tang, E. D. Sudol, C. A. Silebi and M. S. El-Aasser in Journal of Applied Polymer Science 1991 (43), pages 1059 to 1066). The polymer particles A are subsequently prepared by polymerization of appropriate monomers A. As organic solvents which have a low solubility in the aqueous medium, use is made of liquid aliphatic and aromatic hydrocarbons having from 5 to 30 carbon atoms, for example n-pentane and isomers, cyclopentane, n-hexane and isomers, cyclohexane, n-heptane and isomers, n-octane and isomers, n-nonane and isomers, n-decane and isomers, n-dodecane and isomers, n-tetradecane and isomers, n-hexadecane and isomers, n-octadecane and isomers, eicosane, docosane, benzene, toluene, ethylbenzene, cumene, o-, m- or p-xylene, mesitylene and also hydrocarbon mixtures in general which boil in the range from 30 to 250° C. It is likewise possible to use hydroxy compounds such as saturated and unsaturated fatty alcohols having from 10 to 28 carbon atoms, for example n-dodecanol, n-tetradecanol, n-hexadecanol and their isomers or cetyl alcohol, esters such as fatty acid esters having from 10 to 28 carbon atoms in the acid part and from 1 to 10 carbon atoms in the alcohol part or esters of carboxylic acids and fatty alcohols having from 1 to 10 carbon atoms in the carboxylic acid part and from 10 to 28 carbon atoms in the alcohol part. It is of course also possible to use mixtures of the abovementioned solvents.

The amount of organic solvent, based on the aqueous medium comprising water and dispersant, is often $\leq 20\%$ by weight, $\leq 10\%$ by weight, $\leq 5\%$ by weight or $\leq 3\%$ by weight or $\leq 1\%$ by weight. The polymerization reaction is frequently carried out without addition of an organic solvent.

Furthermore, it can be advantageous for at least one water-soluble macromolecular host compound having a hydrophobic cavity and a hydrophilic shell to be present in the aqueous medium during the polymerization of monomer A and/or monomer B. Frequently, only the polymerization of monomer B is carried out in the presence of such a water-soluble macromolecular host compound. For the purposes of the present text, a water-soluble macromolecular host compound is a host compound which has a solubility of $\geq 10$ g per liter of water at 25° C. and 1 bar (absolute). It is advantageous for the solubility of the macromolecular host compounds under the abovementioned conditions to be $\geq 25$ g/l, $\geq 50$ g/l, $\geq 100$ g/l, $\geq 200$ g/l or $\geq 300$ g/l.

As water-soluble macromolecular host compounds, it is advantageous to use, for example, calixarenes, cyclic oligosaccharides, acyclic oligosaccharides and/or their derivatives.

Calixarenes which can be used according to the present invention are described in U.S. Pat. No. 4,699,966, the international patent application WO 89/08092 and in the Japanese patent publications 1988/197544 and 1989/007837.

As cyclic oligosaccharides, it is possible to use, for example, the cycloinulohexoses and cycloinuloheptoses described by Takai et al. in Journal of Organic Chemistry, 1994, 59 (11), pages 2967 to 2975, and also cyclodextrins and/or their derivatives.

Particularly useful cyclodextrins are α-cyclodextrin, β-cyclodextrin or γ-cyclodextrin and also their methyl, triacetyl, hydroxypropyl or hydroxyethyl derivatives. Particular preference is given to the commercially available unmodified compounds Cavamax® W6, Cavamax® W7 or Cavamax® W8, the partially methylated compounds Cavasol® W6M, Cavasol® W7M or Cavasol® W8M and the partially hydroxypropylated compounds Cavasol® W6HP, Cavasol® W7HP or Cavasol® W8HP (trade names of Wacker-Chemie GmbH).

Acyclic oligosaccharides which can be used are, for example, starches and/or their degradation products.

The water-soluble starches or starch degradation products are frequently natural starches which have been made water-soluble by boiling with water, or starch degradation products which are obtained from the natural starches by hydrolysis, in particular acid-catalyzed hydrolysis, enzymatically catalyzed hydrolysis or oxidation. Such degradation products are also referred to as dextrins, roasting dextrins or saccharified starches. Their preparation from natural starches is known to those skilled in the art and is described, for example, in G. Tegge, Starke und Starkederivate, EAS Verlag, Hamburg 1984, page 173ff. and page 220ff. and also in EP-A 0441197. As natural starches, it is possible to use virtually all starches of plant origin, for example starches from maize, wheat, potatoes, tapioca, rice, sago and sorghum.

According to the present invention, chemically modified starches or starch degradation products can also be used. For the purposes of the present invention, chemically modified starches or starch degradation products are starches or starch degradation products in which at least part of the OH groups have been modified, e.g. etherified or esterified. The chemical modification can be carried out either on the natural starches or on the degradation products. It is likewise possible to convert the chemically modified starches afterwards into their chemically modified degradation products.

The esterification of starch or starch degradation products can be carried out using either inorganic or organic acids, their anhydrides or their chlorides. Customary esterified starches are phosphated and/or acetylated starches or starch degradation products. Etherification of the OH groups can be effected, for example, by means of organic halogen compounds, epoxides or sulfates in aqueous alkaline solution. Examples of suitable ethers are alkyl ethers, hydroxyalkyl ethers, carboxyalkyl ethers, allyl ethers and cationically modified ethers, e.g. (trisalkylammonio)alkyl ethers and (trisalkylammonio)hydroxyalkyl ethers. Depending on the type of chemical modification, the starches or the starch degradation products can be uncharged, cationic, anionic or amphiphilic. The preparation of modified starches and starch degradation products is known to those skilled in the art (cf. Ullmann's Encyclopedia of Industrial Chemistry, 5$^{th}$ ed., vol. 25, pages 12 to 21, and the references cited therein).

In one embodiment of the present invention, water-soluble starch degradation products and their chemically modified derivatives which are obtainable by hydrolysis, oxidation or enzymatic degradation of natural starches or chemically modified starch derivatives are used. Such starch degradation products are also referred to as saccharified starches (cf. G. Tegge, Stärke und Starkederivate, EAS Verlag, Hamburg 1984, page 220ff.). Saccharified starches and their derivatives are commercially available as such (e.g. C*Pur® products 01906, 01908, 01910, 01912, 01915, 01921, 01924, 01932 or 01934 from Cerestar Deutschland GmbH, Krefeld) or can be prepared by degradation of commercial starches by known methods, for example by oxidative hydrolysis using peroxides or enzymatic hydrolysis, from the starches or chemically modified starches. Starch degradation products which are obtainable hydrolytically and have not been further modified chemically are advantageous.

In the abovementioned embodiment, starch degradation products or chemically modified starch degradation products having a weight average molecular weight $M_w$ in the range from 1000 to 30 000 dalton and very preferably in the range from 3000 to 10 000 dalton are used. Such starches are completely soluble in water at 25° C. and 1 bar, with the solubility limit generally being above 50% by weight, which is particularly advantageous for the preparation of the copolymers of the present invention in an aqueous medium. C*Pur® 01906 ($M_w$=about 20 000) and C*Pur® 01934 ($M_2$=about 3000), in particular, can be advantageously used.

Reported values for the molecular weight of the abovementioned starch degradation products or chemically modified starch degradation products are based on determinations by means of gel permeation chromatography under the following conditions:

| | |
|---|---|
| Columns: | 3 off 7.5 × 600 mm steel packed with TSK gel G 2000 PW and G 4000 PW, pore opening: 5 μm. |
| Eluant: | deionized water |
| Temperature: | 20 to 25 C. (room temperature) |
| Detection: | Differential refractometer (e.g. ERC 7511) |
| Flow: | 0.8 ml/min; pump: (e.g. ERC 64.00) |
| Injection valve: | 20 μl valve: (e.g. VICI 6-way valve) |
| Evaluation: | Bruker Chromstar GPC software |
| Calibration: | Calibration was carried out in the low molecular weight range using glucose, raffinose, maltose and maltopentose. In the higher molecular weight range, Pullulan standards having a polydispersity of <1.2 were used. |

The amount of water-soluble macromolecular host compound used in the present process is generally from 0.1 to 50 parts by weight, often from 0.2 to 20 parts by weight and frequently from 0.5 to 10 parts by weight, in each case based on 100 parts by weight of monomer A and/or monomer B.

Targetted variation of the monomers A and/or B makes it possible, according to the present invention, to prepare aqueous polymer dispersions whose polymers have a glass transition temperature or a melting point in the range from −60 to 270° C.

For the purposes of the present invention, the glass transition temperature $T_g$ is the limiting value which the glass transition temperature approaches with increasing molecular weight, as described by G. Kanig (Kolloid-Zeitschrift & Zeitschrift für Polymere, vol. 190, p. 1, equation 1). The glass transition temperature or the melting point is determined by the DSC method (differential scanning calorimetry, 20 K/min, midpoint measurement, DIN 53765).

According to Fox (T. G. Fox, Bull. Am. Phys. Soc. 1956 [Ser. II] 1, page 123, and Ullmann's Encyclopädie der technischen Chemie, vol. 19, page 18, 4th edition, Verlag Chemie, Weinheim, 1980), the glass transition temperature of at most weakly crosslinked copolymers obeys, to a good approximation, the following equation:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees Kelvin of the polymers made up in each case of only one of the monomers 1, 2, ... n. The $T_g$ values for the homopolymers of most monomers are known and given, for example, in Ullmann's Encyclopedia of Industrial Chemistry, part. 5, vol. A21, page 169, VCH Weinheim, 1992; further sources of glass transition temperatures of homopolymers are, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989).

The aqueous polymer dispersions which are obtainable by the process of the present invention often comprise polymers whose minimum film formation temperature MFT is $\leqq 80°$ C., frequently $\leqq 50°$ C. or $\leqq 30°$ C. Since an MFT below $0°$ C. can no longer be measured, the lower limit for the MFT can be indicated only by the $T_g$ values. The MFT is determined in accordance with DIN 53787.

The residual contents of unreacted monomers in the aqueous polymer dispersions obtained are frequently reduced by chemical and/or physical methods which are likewise known to those skilled in the art [cf., for example, EP-A 771328, DE-A 19624299, DE-A 19621027, DE-A 19741184, DE-A 19741187, DE-A 19805122, DE-A 19828183, DE-A 19839199, DE-A 19840586 and 19847115].

The aqueous polymer dispersions obtained according to the present invention are frequently stable over a plurality of weeks or months and during this time generally display virtually no phase separation, precipitation or coagulum formation. They are very suitable as, in particular, binders for the production of adhesives, for example pressure-sensitive adhesives, building adhesives or industrial adhesives, sealants, polymer-based plasters and renders and surface coatings, for example for paper coating, emulsion paints or for printing inks and printing varnishes for printing polymer films and for producing nonwovens or for producing protective layers and water vapor barriers, for example in priming. These aqueous polymer dispersions can likewise be used for modifying mineral binders or other polymers.

It may also be pointed out that the aqueous polymer dispersions obtainable according to the present invention can be dried in a simple manner to give redispersible polymer powders (e.g. freeze drying or spray drying). This is particularly true when the glass transition temperature of the polymer A or B which is present in the largest amount in the aqueous polymer dispersion is generally $\geqq 50°$ C., often $\geqq 60°$ C. or $\geqq 70°$ C., frequently $\geqq 80°$ C. or $\geqq 90°$ C. or $\geqq 100°$ C. The polymer powders are likewise suitable as binders in adhesives, sealants, polymer-based plasters and renders and paints, and also for producing nonwovens or for modifying mineral binders, for example mortar or cement, or as modifying additives in other polymers.

It is also possible to subject the aqueous polymer dispersions obtainable according to the present invention to a coagulation step with which those skilled in the art are familiar, as a result of which the polymer coagulates and can be separated off from the aqueous medium by simple filtration. Subsequent drying gives a polymer which can be used, in particular, for modifying other polymers and for producing moldings, in particular by means of injection-molding or extrusion processes, and for coating surfaces.

The process of the present invention opens up an economical, ecological, preparatively simple and very safe route to novel aqueous polymer systems and combines the advantages of free-radically initiated polymerization and polymerization catalyzed by transition metal complexes.

The present invention is illustrated by the following examples.

EXAMPLES

Example 1

Preparation of [1,3-bis(di(n-hydroxypentyl)phosphino)propane]palladium(II) diacetate (as described by Lindner et al., J. Organomet. Chem. 2000, 602, pages 173ff.)

642 mg (1.25 mmol) of 1,3-bis(di(n-hydroxypentyl)phosphino)propane were weighed into a Schlenk tube at 20-25° C. (room temperature) under an argon atmosphere and dissolved in 20 ml of dry, degassed dichloromethane (Aldrich GmbH). In a second Schlenk tube, 286 mg (1.27 mmol) of palladium (II) acetate (99% by weight, Aldrich GmbH) were dissolved in 20 ml of dry, degassed dichloromethane at room temperature while stirring. The 1,3-bis(di(n-hydroxypentyl)phosphino)propane solution was added at room temperature and under an argon atmosphere to the palladium acetate solution over a period of 10 minutes, the mixture was then stirred for 30 minutes and the solvent was subsequently removed under reduced pressure (about 1 mbar absolute). This gave 925 mg (yield: 99%) of [1,3-bis(di(n-hydroxypentyl)phosphino)propane]palladium(II) diacetate in the form of a yellow-brown oil.

Example 2 a) Polymerization of 1-butene/carbon Monoxide in the Presence of a Transition Metal Complex as Catalyst in an Aqueous Medium 200 mg of [1,3-bis(di(n-hydroxypentyl)phosphino)propane]palladium(II) diacetate from Example 1, 25.6 g of a 1% strength by weight aqueous solution of tetrafluoroboric acid (Aldrich GmbH) and 10 g of sodium dodecylsulfate (99% by weight, Aldrich GmbH) were dissolved in succession at room temperature in 2000 ml of deionized water while stirring under a nitrogen atmosphere. The mixture was transferred into a 9 l steel autoclave provided with a mechanical stirrer and an electrically heated jacket. 1600 g of 1-butene were subsequently introduced into the steel autoclave at room temperature. While stirring at room temperature, carbon monoxide was then injected into the autoclave until a pressure of 50 bar had been reached. While stirring, the contents of the autoclave were heated to 60° C. and the carbon monoxide pressure was set to 60 bar and the mixture was stirred for 10 hours while maintaining this constant carbon monoxide pressure. After the contents of the autoclave had been cooled to about 40° C. and the autoclave had been depressurized to 4 bar (absolute), the contents of the autoclave were transferred to a 5 l glass vessel provided with a mechanical stirrer, gas inlet tube and gas outlet tube and were in the process depressurized to atmospheric pressure. Unreacted 1-butene and carbon monoxide were subsequently removed by passing nitrogen through the mixture at about 40° C. for one hour. This gave 2580 g of an aqueous polymer dispersion. After filtration through a 60 μm filter, the solids content of the polymer dispersion was found to be 23% by weight, based on the aqueous polymer dispersion obtained after filtration. The amount of coagulum remaining on the sieve was found to be 0.7% by weight, based on the aqueous polymer dispersion used. The weight average particle size $D_{w50}$ of the polymer particles obtained was 112 nm. The aqueous polymer dispersion obtained was stable and displayed no phase separation or sedimentation over a period of 10 weeks.

The coagulum content was generally determined by filtering the aqueous polymer dispersion obtained through a 60 μm filter cloth. The filter cloth was subsequently rinsed with 100 ml of deionized water and dried to constant weight at 100° C. under atmospheric pressure in a drying oven. The coagulum content of the aqueous polymer dispersion, in each case based on the aqueous polymer dispersion prior to the filtration, was determined from the difference in weight of the filter cloth prior to the filtration and the filter cloth after filtration and drying.

The solids content was generally determined by drying about 1 g of the aqueous polymer dispersion obtained after filtration to constant weight in an open aluminum crucible having an internal diameter of about 3 cm at 100° C. under atmospheric pressure in a drying oven. To determine the solids content, two separate measurements were carried out in each case and the corresponding mean was calculated. The solids content is in each case based on the aqueous polymer dispersion after filtration.

The particle sizes were determined either by the method of the analytical ultracentrifuge (W. Mächtle, Makromolekulare Chemie 1984 (185), pages 1025 to 1039) or by means of dynamic light scattering (Autosizer IIC from Malvem Instruments, England), with the mean diameter of the cumulated distribution [cumulant z-average] of the measured autocorrelation function in accordance with the ISO standard 13321 being reported.

10 ml of the aqueous polymer dispersion obtained were placed in a polyethylene dish having an internal diameter of about 5 cm and dried at 23° C. and 50% relative atmospheric humidity for 24 hours. A brittle, cracked polymer film was obtained. The glass transition temperature of the polymer was determined as 9° C. Furthermore, the polymer had a broad melting point range of from 80 to 120° C. The glass transition temperature and the melting point (melting range) were generally determined in accordance with DIN 53765 by means of a DSC 820 instrument, series TA 8000, from Mettler-Toledo.

The molecular weight of the dried polymer film was determined by gel permeation chromatography (GPC) (hexafluoroisopropanol containing 0.05% by weight of potassium trifluoroacetate; calibration was carried out using narrow-distribution polymethacrylate standards from PSS having molecular weights of from M=505 to M=2 740 000; elution ranges outside this range were estimated by extrapolation; detection was carried out using a differential refractometer HP 1100 from Hewlett Packard). The number average molecular weight $M_n$ was 9000 g/mol and the mass average molecular weight $M_w$ was 21000 g/mol.

b) Free-Radical Emulsion Polymerization in the Presence of the Polyketone Dispersion a)

265.5 g of the aqueous polyketone dispersion a) were placed under a nitrogen atmosphere in a glass reactor which is thermostatted in a heating bath and provided with a mechanical stirrer, reflux condenser and two stirred feed vessels. Feed vessel 1 was charged with an emulsion consisting of 119 g of deionized water, 4.8 g of a 15% strength by weight aqueous solution of sodium n-dodecylbenzenesulfonate, 119 g of n-butyl acrylate and 1.2 g of acrylic acid. Feed vessel 2 was charged with a solution consisting of 0.84 g of sodium peroxodisulfate and 40 g of deionized water.

The initial charge was heated to 80° C. while stirring under a nitrogen atmosphere, admixed with 4 g of feed stream 2 and stirred for 10 minutes. Feed stream 1 was then added continuously over a period of one hour and the remainder of feed stream 2 was added continuously over a period of one and a half hours, both at the abovementioned temperature, and the mixture was subsequently cooled to room temperature.

The aqueous polymer dispersion obtained had a coagulum content of 0.5% by weight and the solids content was found to be 33% by weight. The weight average particle size $D_{w50}$ of the polymer particles obtained was 188 nm.

10 ml of the aqueous polymer dispersion obtained were placed in a polyethylene dish having an internal diameter of about 5 cm and dried at 23° C. and 50% relative atmospheric humidity for 24 hours. A closed, flexible and transparent polymer film was obtained. The glass transition temperature of the polymer was found to be 40° C. Furthermore, the polymer had a broad melting point range from about 80 to 120° C.

Example 3

A polystyrene dispersion which had been prepared by free-radical emulsion polymerization and had a weight average particle diameter $D_{w50}$ of 30 nm and a polydispersity index of <1.5 was diluted with deionized water to a solids content of 10% by weight.

100 ml of this aqueous polystyrene dispersion were admixed in a Schlenk tube with 10 ml of a 10% strength by weight solution of [1,3-bis(di(n-hexyl)phosphino)propane] palladium(II) diacetate (prepared as described in Example 1) in styrene and the mixture was stirred at room temperature under a nitrogen atmosphere for 24 hours. The polystyrene particles were then swelled by means of a catalyst solution in styrene and separate styrene droplets could no longer be seen (optical microscope; magnification: 40×).

10 g of the abovementioned "swollen" polystyrene dispersion were stirred into 2000 g of deionized water under a nitrogen atmosphere and, at room temperature, admixed in succession with 12 g of a 1% strength by weight solution of tetrafluoroboric acid in deionized water, 10 g of sodium dodecylsulfate (from Aldrich GmbH) and 20 g of cyclodextrin Cavasol® W7 M (from Wacker-Chemie GmbH). The aqueous mixture was transferred to a 9 l steel autoclave provided with a mechanical stirrer and an electrically heated jacket. 100 g of 1-hexene were then metered into the autoclave, likewise at room temperature, carbon monoxide was introduced to a pressure of 50 bar and the contents of the autoclave were heated to 60° C. The carbon monoxide pressure was regulated at a constant 60 bar. While stirring and under a constant carbon monoxide pressure, 900 g of 1-hexene were metered in over a period of 10 hours by means of an HPLC pump. The reaction mixture was subsequently maintained at this temperature for another 2 hours, the autoclave was depressurized to 4 bar and the contents of the autoclave were transferred to a 5 l glass vessel equipped with a mechanical stirrer and a gas inlet tube and gas outlet tube. Unreacted 1-hexene was removed by passing gaseous nitrogen through the aqueous dispersion at 70° C. for one hour. This gave 2830 g of an aqueous polymer dispersion. The aqueous polymer dispersion obtained had a coagulum content of 0.1% by weight. The solids content was found to be 28% by weight. The mean particle size of the polymer particles obtained was determined by means of dynamic light scattering, giving a value of 260 nm.

10 ml of the aqueous polymer dispersion obtained were placed in a polyethylene dish having an internal diameter of about 5 cm and dried at 23° C. and 50% relative atmospheric humidity for 24 hours. A brittle, closed film was obtained. The glass transition temperature of the polymer was found to be −10° C.

The molecular weight of the polymer film obtained was determined by means of gel permeation chromatography. The number average molecular weight $M_n$ was 8600 g/mol and the mass average molecular weight $M_w$ was 20 000 g/mol.

Example 4 a) Preparation of a Polyethylene Dispersion in the Presence of a Transition Metal Complex as Catalyst 19 mg of tetrachlorobenzoquinone (from Aldrich GmbH) were dissolved under an argon atmosphere in a dry and degassed mixture of 4 g of toluene, 0.2 g of hexadecane and 1 ml of methanol in a Schlenk tube, 18 mg of triphenylphosphine and 20 mg of bis(cyclooctadiene)nickel(0) (from Strem Chemicals Inc.) were then added to the solution while stirring at room temperature and the resulting solution was stirred for 30 minutes. This solution was subsequently admixed while stirring with 95 ml of a 1% strength by weight solution of sodium dodecylsulfate in deionized water, forming an oil-in-water macroemulsion. A miniemulsion was produced therefrom by high-pressure homogenization at 750 bar using a Microfluidizer (model 120 from Microfluidics Corp.). The mean droplet size of the emulsion droplets was determined by means of pseudoelastic dynamic light scattering using a Coulter N4 Plus Particle Analyzer from Coulter Scientific Instruments, giving a value of 150 nm. The aqueous miniemulsion obtained was transferred under an argon atmosphere to a 300 ml autoclave equipped with a mechanical stirrer, electric heating and two separate inlets. Ethene was subsequently introduced to a pressure of 50 bar while stirring and the reaction mixture was heated to 50° C. under a constant ethene pressure and maintained at this temperature for two hours while stirring. A 5 ml sample was subsequently taken via a riser tube. The solids content of the polymer dispersion obtained was found to be 19% by weight.

The aqueous polymer dispersion obtained was placed in a polyethylene dish having an internal diameter of about 5 cm and dried at 23° C. and 50% relative atmospheric humidity for 24 hours. A colorless, cracked polymer film which did not have a measurable glass transition temperature was obtained. However, the polymer had a melting point of about 126° C.

The molecular weight of the polymer film obtained was determined by means of GPC (o-xylene; calibration was carried out using narrow-distribution polystyrene from PSS having molecular weights of from M=400 to M=2.5 million g/mol; elution regions outside this range were estimated by extrapolation; detection was by means of a differential refractometer HP 1100 from Hewlett Packard). The number average molecular weight $M_n$ was 6000 g/mol and the mass average molecular weight $M_w$ was 16 000 g/mol.

b) Free-Radical Emulsion Polymerization in the Presence of the Polyethylene Dispersion a)

The temperature of the autoclave contents obtained under a) was increased to 85° C. while maintaining the ethene pressure of 50 bar. 5 g of a feed stream 1 consisting of an emulsion composed of 60 g of vinyl acetate, 40 g of deionized water, 0.2 g of Mowiol 4088 (polyvinyl alcohol from Clariant) and 0.5 g of sodium dodecylsulfate (from Aldrich GmbH) were subsequently metered into the autoclave while stirring. After 5 minutes and commencing at the same time, the remainder of feed stream 1 and the total amount of feed stream 2 consisting of a solution of 1 g of sodium peroxodisulfate in 5 g of deionized water were metered in via two separate inlets over a period of 1.5 hours. After an after-reaction time of half an hour, the contents of the autoclave were cooled to room temperature and depressurized to atmospheric pressure.

The aqueous polymer dispersion was filtered through a 60 μm filter cloth, with only traces of coagulum being found. The solids content of the aqueous polymer dispersion obtained was 38% by weight and the mean particle size of the polymer particles determined by means of dynamic light scattering was 210 nm.

10 ml of the aqueous polymer dispersion obtained were placed in a polyethylene dish having an internal diameter of about 5 cm and dried at 23° C. at and 50% relative atmospheric humidity for 24 hours. A clear flexible film was obtained. The glass transition temperature of the polymer was found to be 5° C. In addition, the polymer had a melting point of about 120° C.

Example 5 a) Preparation of a Polybutadiene Dispersion in the Presence of a Transition Metal Complex as Catalyst 82 mg of cobalt(II) octanoate (from Strem Chemicals Inc.) were weighed under an argon atmosphere into a Schlenk tube provided with a magnetic stirrer and the Schlenk tube was subsequently cooled to −10° C. using a cryostat. About 300 mg of 1,3-butadiene (butadiene for short) were then condensed into the Schlenk tube, 470 mg of a 30% strength by weight solution of triisobutylaluminum in toluene (from Aldrich GmbH) were subsequently added and the mixture obtained was stirred at −10° C. for 10 minutes. The mixture was transferred into a steel autoclave which had a volume of 300 ml and had been heated to 50° C. and filled with nitrogen and into which 100 ml of deionized and degassed water, 1 g of sodium dodecylsulfate, 18 mg of carbon disulfide and 30 g of butadiene had been introduced beforehand. This reaction mixture was allowed to react at 50° C. for 2 hours while stirring. A 5 ml sample was subsequently taken via a riser tube.

The solids content of the aqueous polymer dispersion obtained was 18% by weight and the mean particle size of the polymer particles determined by means of dynamic light scattering was 230 nm.

1 ml of the aqueous polymer dispersion obtained was placed in a polyethylene dish having an internal diameter of about 5 cm and dried at 23° C. and 50% relative atmospheric humidity for 24 hours. A white powder was obtained. The glass transition temperature of the polymer was found to be −17° C. Furthermore, the polymer had a melting point of about 175° C.

b) Free-Radical Emulsion Polymerization in the Presence of the Polybutadiene Dispersion a)

The autoclave contents obtained from a) were heated to 90° C. while stirring, 1 g of a feed stream 3 was then metered in and the mixture was stirred for 10 minutes at the abovementioned reaction temperature. Commencing at the same time, the total amounts of feed stream 1 and feed stream 2 were then metered in continuously over a period of 2 hours and the remainder of feed stream 3 was metered in continuously over a period of 2.5 hours. After the metered addition of feed stream 3 was complete, the mixture was stirred at the reaction temperature for another 15 minutes, then cooled to about 30-35° C. and the contents of the reactor were depressurized to atmospheric pressure. To decrease the concentration of unreacted butadiene, gaseous nitrogen was subsequently passed through the resulting aqueous polymer dispersion for about one hour.

| | |
|---|---|
| Feed stream 1: | 50 g of butadiene |
| Feed stream 2: | aqueous emulsion made up of 50 g of styrene, 1 g of acrylic acid, 0.2 g of tert-dodecyl mercaptan, 3.0 g of a 28% strength by weight aqueous solution of Texapon ® NSO (from Cognis) and 40 g of deionized water |
| Feed stream 3: | 0.5 g of sodium peroxodisulfate dissolved in 10 g of deionized water |

The aqueous polymer dispersion obtained had a coagulum content of 0.4% by weight and the solids content was found to be 46% by weight. The mean particle size of the resulting polymer particles determined by means of dynamic light scattering was 303 nm.

10 ml of the aqueous polymer dispersion obtained were placed in a polyethylene dish having an internal diameter of about 5 cm and dried at 23° C. and 50% relative atmospheric humidity for 24 hours. A clear flexible film was obtained. The glass transition temperature of the polymer was found to be −5° C. Furthermore, the polymer had a melting point of about 170° C.

We claim:

1. A process for preparing an aqueous polymer dispersion, the process comprising:
   either
   (1) preparing polymer particles A having a weight average particle diameter of $\geq 1$ nm from at least one ethylenically unsaturated monomer A by a polymerization initiated by at least one free-radical initiator and then polymerizing at least one ethylenically unsaturated monomer B in an aqueous medium in the presence of said polymer particles A and at least one dispersant, and initiated by at least one hydrolysis-stable transition metal complex, or
   (2) preparing polymer particles A having a weight average particle diameter of $\geq 1$ nm from at least one ethylenically unsaturated monomer A by a polymerization initiated by at least one hydrolysis-stable transition metal complex and then polymerizing at least one ethylenically unsaturated monomer B in an aqueous medium in the presence of said polymer particles A and at least one dispersant, and initiated by at least one free-radical initiator.

2. The process as claimed in claim 1, wherein a weight ratio of the polymer particles A to at least one monomer B is from 1:1000 to 1000:1.

3. The process as claimed in claim 1, wherein the polymer particles A are prepared in the form of an aqueous primary dispersion prior to polymerizing at least one ethylenically unsaturated monomer B.

4. The process as claimed in claim 1, wherein the polymerization of at least one monomer A or monomer B initiated by the at least one hydrolysis-stable transition metal complex is carried out in the presence of carbon monoxide.

5. The process as claimed in claim 1, wherein the polymerization initiated by at least one free-radical initiator is carried out using a mixture of at least one monomer A or at least one monomer B which comprises
   from 50 to 99.9% by weight of esters of acrylic and/or methacrylic acid with alkanols having from 1 to 12 carbon atoms and/or styrene, or
   from 50 to 99.9% by weight of styrene and/or butadiene, or
   from 50 to 99.9% by weight of vinyl chloride and/or vinylidene chloride, or
   from 40 to 99.9% by weight of vinyl acetate, vinyl propionate, vinyl esters of neodecanoic acid and/or vinyl esters of long-chain fatty acids.

6. The process as claimed in claim 1, wherein the polymerization initiated by the at least one hydrolysis-stable transition metal complex is carried out using an ethene, a propene, a 1-butene, a 1-pentene, a 1-hexene, a 1-octene or a 1-decene as a main monomer A or monomer B in a proportion of $\geq 50\%$ by weight, based on the total amount of monomers used for the polymerization.

7. The process as claimed in claim 1, wherein the polymerization of the monomer B is carried out in the presence of a water-soluble macromolecular host compound which has a hydrophobic cavity and a hydrophilic shell.

8. A method for making at least one selected from the group consisting of adhesives, sealants, polymer-based plasters, polymer-based renders, paper coating compositions, and paints, comprising:
   adding the aqueous polymer dispersion obtained by the process of claim 1 into the adhesive, sealant, polymer-based plaster, polymer-based render, paper-coating composition, or paint.

9. A method for making at least one selected from the group consisting of adhesives, sealants, polymer-based plasters, and polymer-based renders, paper coating compositions, and paints, comprising:
   adding a polymer powder obtained from the aqueous polymer dispersion obtained by the process of claim 1 into the adhesive, sealant, polymer-based plaster, polymer-based render, paper-coating composition, or paint.

10. A method for producing nonwovens, comprising:
    adding the aqueous polymer dispersion obtained by the process of claim 1 during production of the nonwoven.

11. A method for producing nonwovens, comprising:
    adding a polymer powder obtained from the aqueous polymer dispersion obtained by the process of claim 1 during production of the nonwoven.

12. A method for modifying at least one selected from the group consisting of mineral binders and other polymers, comprising:
    adding the aqueous polymer dispersion obtained by the process of claim 1 into the mineral binder or other polymer.

13. A method for modifying at least one selected from the group consisting of mineral binders and other polymers, comprising:
    adding a polymer powder obtained from the aqueous polymer dispersion obtained by the process of claim 1 into the mineral binder or other polymer.

14. The process as claimed in claim 1, which is carried out in the presence of an organic solvent during initiation with said at least one hydrolysis-stable transition metal complex.

15. The process as claimed in claim 7, wherein the water-soluble macromolecular host compound is a calixarene, cyclic oligosaccharide, acyclic oligosaccharide, or derivative of the aforesaid host compounds.

16. A process for preparing an aqueous polymer dispersion, the process comprising:
either
(1) preparing polymer particles A having a weight average particle diameter of $\geq 1$ nm and $\leq 1000$ nm from at least one ethylenically unsaturated monomer A by a polymerization initiated by at least one free-radical initiator and then polymerizing at least one ethylenically unsaturated monomer B in an aqueous medium in the presence of said polymer particles A and at least one dispersant, and initiated by at least one transition metal complex, or
(2) preparing polymer particles A having a weight average particle diameter of $\geq 1$ nm and $\leq 1000$ nm from at least one ethylenically unsaturated monomer A by a polymerization initiated by at least one transition metal complex and then polymerizing at least one ethylenically unsaturated monomer B in an aqueous medium in the presence of said polymer particles A and at least one dispersant, and initiated by at least one free-radical initiator.

17. A process for preparing an aqueous polymer dispersion, the process comprising preparing polymer particles A having a weight average particle diameter of $\geq 1$ nm from at least one ethylenically unsaturated monomer A by a polymerization initiated by at least one free-radical initiator and then polymerizing at least one ethylenically unsaturated monomer B in an aqueous medium in the presence of said polymer particles A and at least one dispersant, and initiated by at least one transition metal complex.

18. A process for preparing an aqueous polymer dispersion, the process comprising preparing polymer particles A having a weight average particle diameter of $\geq 1$ nm from at least one ethylenically unsaturated monomer A by a polymerization initiated by at least one hydrolysis-stable transition metal complex and then polymerizing at least one ethylenically unsaturated monomer B in an aqueous medium in the presence of said polymer particles A and at least one dispersant, and initiated by at least one free-radical initiator.

* * * * *